Sept. 19, 1950 — L. BALDO — 2,522,494
HOSE CLAMP
Filed Aug. 30, 1945
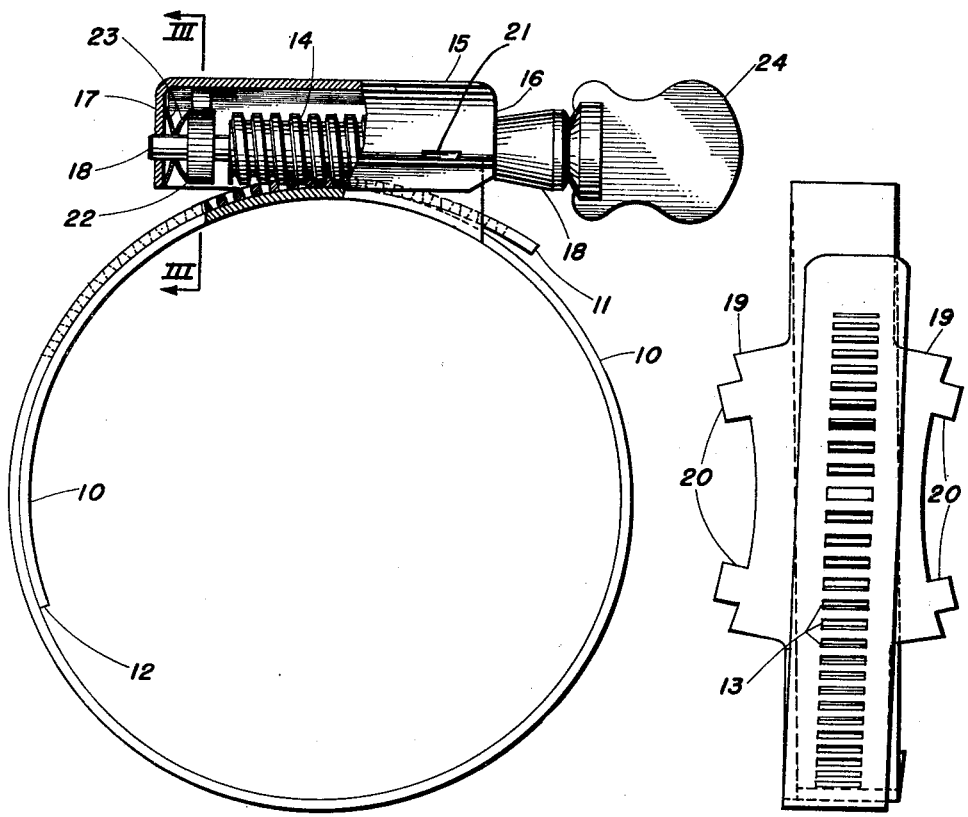
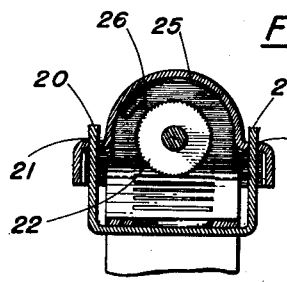
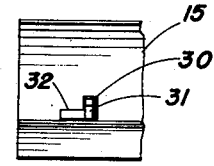
Inventor
Louie Baldo
By Ralph L. Chappell
Attorney Patented Sept. 19, 1950

2,522,494

UNITED STATES PATENT OFFICE 2,522,494

HOSE CLAMP

Louie Baldo, United States Navy

Application August 30, 1945, Serial No. 613,692

3 Claims. (Cl. 24—19)

(Granted under the act of March 3, 1883, as amended April 30, 1928; 370 O. G. 757)

This invention relates to an improved hose clamp of the type adapted to connect a length of flexible hose to a metallic tube or the like, as for a water connection between the radiator and block of an internal combustion engine, and is particularly directed to the type of split band clamp which is tightened by means of teeth on one end of the band and a worm gear carried on the opposite end of the band engaging with the said teeth.

An object of this invention is to provide a hose clamp of the type described which is self-locking but which permits rotation of the worm gear in the direction which tightens the clamp but restricts rotation in the direction that loosens the clamp.

Another object of this invention is to provide a hose clamp of the type described that may be manually locked to prevent loosening of the clamp.

A further object of this invention is to provide a clamp of the type described that can be assembled with a minimum number of separate parts without spot welding or the like.

Another object of this invention is to provide a cold flow compensator that will automatically take up the slack in the clamp and hose connection due to the cooling of the engine.

Another object of this invention is to provide a clamp that protects the hose from injury from the tightening mechanism.

Other objects and advantages of this invention will become apparent when considered in connection with the accompanying claims and drawings, wherein like characters of reference designate like parts throughout, and wherein:

Fig. I is a longitudinal section view of the clamp embodied in this invention;

Fig. II is a partial exploded plan view showing the band, teeth and retaining ears of the clamp embodied in this invention;

Fig. III is a cross section view of the clamp embodied in this invention taken on the lines III—III of Fig. I;

Fig. IV is a cross section view of the one modification of the locking device as embodied by this invention; and Fig. V is an end plan view of the housing carrying the locking device of Fig. IV showing the lock release.

Referring now to the drawings, wherein for the purpose of illustration is shown a preferred embodiment of this invention, the numeral 10 designates a tape or split band substantially of the conventional type used in housing clamp connections, except that the said band 10 is substantially 120 degrees more than a complete circle when closed, the one end terminating at 11 and the second end terminating at 12, so as to give an overlap to the band when in place on a hose or the like. Stamped or cut in any conventional manner adjacent the end 11 of the clamp 10 is a series of slots 13 which form teeth of a gear on the band 10 at the end 11. Coacting with the teeth 13 is a worm gear 14 adapted to tighten or loosen the band 10 as the gear is rotated in a clockwise or counterclockwise direction. A case 15 having depending lips 16 and 17 on the end portions supports a shaft 18 of the gear 14 by passing through apertures in the lips 16 and 17.

The housing 15 may be substantially of any shape or length desired but will naturally vary with individual specific designs of the clamp, and is supported approximately 120 degrees from the end 12 of the band 10 by flanges 19 stamped integral with the band 10 as shown more clearly in Fig. II. Ears 20 are provided on the flange 19 and are adapted to pass through slots 21 in the housing 15. After insertion of the slot in the housing the ears 20 are peened down to hold the housing rigidly in place.

Carried upon one end of the shaft 18 adjacent the worm screw 14 is a ratchet wheel, knurled or serrated drum or spur 22 affixed thereto rigidly by a press fit or the like. Between the ratchet 22 and the end 17 of the housing 15 are two disc spring washers 23. Rigidly affixed to the end of the shaft 18 is a thumb plate 24 or the like for turning the worm gear to enable the clamp to be tightened.

A reversible tension spring 25, having a pawl or claw 26 on the end thereof, is rigidly affixed to the housing 15 in any suitable manner, and is adapted for engagement with the ratchet wheel or spur 22, as more clearly shown in Fig. III. It is to be noted that the pawl 26 engages with the ratchet wheel 22 sufficiently off center so that when the ratchet wheel is turned in one direction the tension of the spring 25 is counteracted, thereby permitting the pawl 26 to be lifted away from the ratchet wheel 22, which in turn permits relatively free movement of the worm gear 14, and when the worm gear 14 is turned in the opposite direction the tension on the spring 25 is complemented, thereby urging the pawl 26 into more positive engagement with the ratchet wheel 22 thereby serving as a restriction or brake on the rotational movement of the worm screw.

Referring now to Figs. IV and V for an explanation of the modification of the clamp embodied in this invention, the numeral 15 designates the housing and the numeral 22 designates the spur or ratchet wheel. A V spring 27 pivoted at 28 is provided in the housing 15 as shown. A positive action pawl 29 is rigidly affixed to the spring 27 as shown and is adapted for engagement with the ratchet wheel 22 in such a manner that when the spring is in a locked position movement in either direction of the ratchet wheel and the worm gear is prohibited. The end 30 of the spring 27 opposite the pivot 28 extends through an opening 31 having an offset 32 in the side of the housing 15, substantially as shown.

In operation the hose clamp embodied in this invention is affixed over the flexible hose and when tightened or made smaller in diameter causes the flexible hose to firmly clip a supporting metallic tube or the like in a conventional manner. The clamp is tightened by turning the thumb screw 24, preferably in a clockwise direction, depending on the direction of pitch of the teeth of the gear. As the clamp is drawn to the desired tightness, the spring 27 bears against the ratchet wheel 22 and provides sufficient tension on the ratchet wheel and gear to prevent the gear from turning loose due to the jar and vibration of the motor. The flexible spring washers 23 urge the clamp tighter so that when the motor cools and contracts the clamp will automatically be drawn tighter. In the modification of the braking attachment shown in Figs. IV and V the pawl 29 positively holds the ratchet wheel and prohibits any rotation of the gear 14 until the pawl has been released. Release of the pawl is accomplished by bearing downward on the end 30 of the spring 27 and by pressing the spring over into the recess 32 which holds the end of the spring down and the pawl out of engagement. To lock the worm gear 14 in place the spring 30 is merely slid out of the recess 32 and allowed to spring back into the opening 31 thus locking the ratchet wheel.

It is to be understood that the form of this invention, herewith shown and described, is to be taken as a preferred example of the same, and that various changes in the shape, size and arrangement of parts may be resorted to, without departing from the spirit of this invention, or the scope of the subjoined claims.

The invention described herein may be manufactured and used by or for the Government of the United States of America for governmental purposes without the payment of any royalties thereon or therefor.

What I claim is:

1. In a hose clamp consisting of a split band having teeth disposed at one end, a housing affixed to the opposite end of the said band, and a worm gear rotatably carried by the said housing in engagement with the said teeth for loosening and tightening the said clamp; a ratchet rigidly affixed to the said worm gear, a tension spring affixed at one end to the said housing having a free end extending outside the said housing for manual manipulation, a pawl affixed to the said spring coacting with the said ratchet to lock the said gear, said housing having an offset opening located adjacent the said ratchet for receiving the free end of said spring.

2. A hose clamp consisting of a split band having teeth disposed at one end, a housing affixed to the opposite end of said band, a worm gear rotatably carried by the said housing in engagement with said teeth for loosening and tightening said clamp, said worm gear having means secured thereto and extending outside the housing for manual operation, a ratchet rigidly affixed to said worm gear, a tension spring affixed at one end to said housing and having a free end extending outside said housing for manual manipulation, and a pawl affixed to said spring coacting with said ratchet to lock the gear, said housing having an offset opening located adjacent said ratchet for receiving the free end of said spring.

3. A hose clamp according to claim 2 wherein said means secured to the worm gear and extending outside the housing for manual operation comprises a shaft and thumb plate mounted upon said shaft.

LOUIE BALDO.

REFERENCES CITED

The following references are of record in the file of this patent:

UNITED STATES PATENTS

| Number | Name | Date |
|---|---|---|
| 640,080 | Barber | Dec. 26, 1899 |
| 1,397,508 | Gillet | Nov. 22, 1921 |
| 1,399,517 | Postal | Dec. 6, 1921 |
| 1,584,935 | Hathorn | May 18, 1926 |
| 2,386,629 | North et al. | Oct. 9, 1945 |

FOREIGN PATENTS

| Number | Country | Date |
|---|---|---|
| 523,313 | Great Britain | July 11, 1940 |